US012794211B2

(12) United States Patent
Lei et al.

(10) Patent No.: US 12,794,211 B2
(45) Date of Patent: Nov. 10, 2026

(54) OUTPUT CONTROL CIRCUIT, START POWER SUPPLY, AND BATTERY CLIP

(71) Applicant: SHENZHEN CARKU TECHNOLOGY CO., LIMITED, Shenzhen (CN)

(72) Inventors: Yun Lei, Shenzhen (CN); Zhifeng Zhang, Shenzhen (CN); Jianping Lin, Shenzhen (CN)

(73) Assignee: SHENZHEN CARKU TECHNOLOGY CO., LIMITED, Shenzhen (CN)

( * ) Notice: Subject to any disclaimer, the term of this patent is extended or adjusted under 35 U.S.C. 154(b) by 248 days.

(21) Appl. No.: 18/432,950

(22) Filed: Feb. 5, 2024

(65) Prior Publication Data

US 2024/0178651 A1 May 30, 2024

Related U.S. Application Data

(63) Continuation of application No. PCT/CN2021/111798, filed on Aug. 10, 2021.

(51) Int. Cl.
*H02H 3/00* (2006.01)
*H02H 3/08* (2006.01)

(52) U.S. Cl.
CPC .................................... *H02H 3/08* (2013.01)

(58) Field of Classification Search
CPC ........................................................ H02H 3/08
See application file for complete search history.

(56) References Cited

U.S. PATENT DOCUMENTS 7,113,381 B2 9/2006 Francis
2003/0134183 A1 7/2003 Iwasaki et al.
(Continued)

FOREIGN PATENT DOCUMENTS

CN 204131171 U † 1/2015
CN 109149526 A 1/2019
(Continued)

OTHER PUBLICATIONS

Extended European Search Report issued in corresponding EP application No. 21953077.1 dated Oct. 18, 2024.
(Continued)

*Primary Examiner* — Stephen W Jackson
(74) *Attorney, Agent, or Firm* — HAUPTMAN HAM, LLP

(57) ABSTRACT

An output control circuit, a start power supply, and a battery clip are provided in the present disclosure. The output control circuit includes a power supply end, a load end, and a first protection module. The power supply end is configured to be connected with a power supply module. The load end is configured to be connected with an external load device. The power supply end is electrically connected with the load end at least through the first protection module, to implement the power supply module supplying power to the external load device at least through the first protection module. The first protection module is configured to monitor a power supply state of the power supply module supplying power to the external load device, and disconnect a connection between the power supply end and the load end or limit a current based on the power supply state.

19 Claims, 11 Drawing Sheets

(56) References Cited

U.S. PATENT DOCUMENTS

| | | | | |
|---|---|---|---|---|
| 2014/0368961 | A1* | 12/2014 | Xi | H02H 3/083<br>361/93.2 |
| 2016/0358738 | A1* | 12/2016 | Schwartz | H01H 19/14 |
| 2018/0040443 | A1 | 2/2018 | Yokota et al. | |
| 2019/0379200 | A1* | 12/2019 | Fournier | H02H 3/20 |
| 2020/0220231 | A1* | 7/2020 | Peng | H02H 3/08 |
| 2021/0135447 | A1* | 5/2021 | Nandy | H02H 5/044 |

FOREIGN PATENT DOCUMENTS

| | | | | |
|---|---|---|---|---|
| CN | 208337235 | U | | 1/2019 |
| CN | 208479195 | U | † | 2/2019 |
| CN | 109910797 | A | | 6/2019 |
| CN | 212012175 | U | † | 11/2020 |
| CN | 109910797 | B | † | 12/2020 |
| CN | 112366788 | A | | 2/2021 |
| CN | 213213166 | U | † | 5/2021 |
| WO | 9956374 | A1 | | 11/1999 |
| WO | 2017185700 | A1 | | 11/2017 |
| WO | 2021101800 | A1 | | 5/2021 |

OTHER PUBLICATIONS

WIPO, International Search Report and Written Opinion for International Application No. PCT/CN2021/111798, Apr. 2, 2022.

First Office Action issued in corresponding CN application No. 202180092286.9 dated Aug. 29, 2026.

* cited by examiner
† cited by third party

OUTPUT CONTROL CIRCUIT, START POWER SUPPLY, AND BATTERY CLIP

CROSS-REFERENCE TO RELATED APPLICATIONS

This application is a continuation of International Application No. PCT/CN2021/111798, filed on Aug. 10, 2021, the entire disclosure of which is incorporated herein by reference.

TECHNICAL FIELD

This disclosure relates to the technical field of circuits, and in particular to an output control circuit, a start power supply, and a battery clip.

BACKGROUND

For an emergency start power supply product, an ignition output electronic switch are controlled by a programmable control device, such as a micro-controller unit (MCU). The programmable control device determines whether a loop electronic switch is turned on for vehicle ignition according to a battery voltage and a load state. It can be seen that stability of an output control signal may be affected by hardware and software. When a hardware recognition circuit or the software fails, the loop electronic switch will not work normally, which will make a product unusable.

SUMMARY

In a first aspect, an output control circuit is provided in implementations of the present disclosure. The output control circuit includes a power supply end, a load end, and a first protection module. The power supply end is configured to be connected with a power supply module. The load end is configured to be connected with an external load device. The power supply end is electrically connected with the load end through the first protection module. The first protection module is configured to disconnect an electrical connection between the power supply end and the load end or limit a current, based on a power supply state of the power supply module supplying power to the external load device.

In a second aspect, a start power supply is provided in implementations of the present disclosure. The start power supply includes a first housing, a power supply module, and an output control circuit. The output control circuit includes a power supply end, a load end, and a first protection module. The power supply end is configured to be connected with a power supply module. The load end is configured to be connected with an external load device. The power supply end is electrically connected with the load end through the first protection module. The first protection module is configured to disconnect an electrical connection between the power supply end and the load end or limit a current, based on a power supply state of the power supply module supplying power to the external load device. The power supply module and at least part of the output control circuit are disposed in the first housing. The power supply end of the output control circuit is configured to be connected with the power supply module of the start power supply.

In a third aspect, a battery clip is provided in implementations of the present disclosure. The battery clip includes a second housing, a power supply input interface, and an output control circuit. The power supply input interface is disposed on the second housing and configured to be connected with a power supply module. The output control circuit includes a power supply end, a load end, and a first protection module. The power supply end is configured to be connected with a power supply module. The load end is configured to be connected with an external load device. The power supply end is electrically connected with the load end through the first protection module. The first protection module is configured to disconnect an electrical connection between the power supply end and the load end or limit a current, based on a power supply state of the power supply module supplying power to the external load device. At least part of the output control circuit is disposed in the second housing. The power supply end of the output control circuit is configured to be connected with the power supply input interface and be connected with the power supply module through the power supply input interface.

BRIEF DESCRIPTION OF THE DRAWINGS

In order to describe technical solutions of implementations in the present disclosure or the related art more clearly, the following will give a brief introduction to accompanying drawings used for describing the implementations or the related art. Apparently, the accompanying drawings hereinafter described are merely some implementations of the present disclosure. Based on these drawings, those of ordinary skill in the art can also obtain other drawings without creative effort.

DETAILED DESCRIPTION

The following will give a clear and complete description to a technical solution of implementations in the present disclosure, with reference to accompanying drawings of the implementations in the present disclosure. The accompanying drawings are just illustrative and refer to schematic views, rather than limiting, the present disclosure.

Unless stated otherwise, all technical and scientific terms used in the present disclosure have the same meaning as commonly understood by those skilled in the art. The terms used in the specification of the present disclosure are just for a purpose of describing specific implementations and are not intended to limit the present disclosure. In subsequent descriptions, suffixes such as "module", "part", or "unit" are used to represent elements, which just facilitates descripting the present disclosure, and the suffixes have no specific meanings of their own. Therefore, "module", "part", or "unit" may be used mixedly.

Apparently, implementations hereinafter described are merely some implementations, rather than all implementations, of the present disclosure. All other implementations obtained by those skilled in the art based on the implementations herein without creative efforts shall fall within the protection scope of the present disclosure.

Unless stated otherwise, "connection" used in the present disclosure, can include "direct connection" or "indirect connection". For example, a first protection module is connected with a power supply end, where the first protection module may be directly connected with the power supply end, or indirectly connected with the power supply end via other circuit modules. There is no restriction that the connection must have a wire or a port, and wireless transmission is one of "connections" mentioned herein.

Unless stated otherwise, "electrical connection" used in the present disclosure can realize transmission of electrical parameters or electrical signals, and the electrical parameters or electrical signals include at least one of: current, voltage, power, capacitance, analog signal, or digital signal.

An output control circuit is provided in the present disclosure. The output control circuit is provided with a first protection module in a loop of a power supply end and a load end. The first protection module is configured to disconnect a connection between the power supply end and the load end, based on a power supply state of supplying power through the first protection module. When the output power supply is abnormal, the first protection module can timely control discharge output of the power supply module to the external load, so as to realize output circuit protection of a product. The output control circuit may be applicable to an emergency start power supply, or a battery clip.

Figure 1:
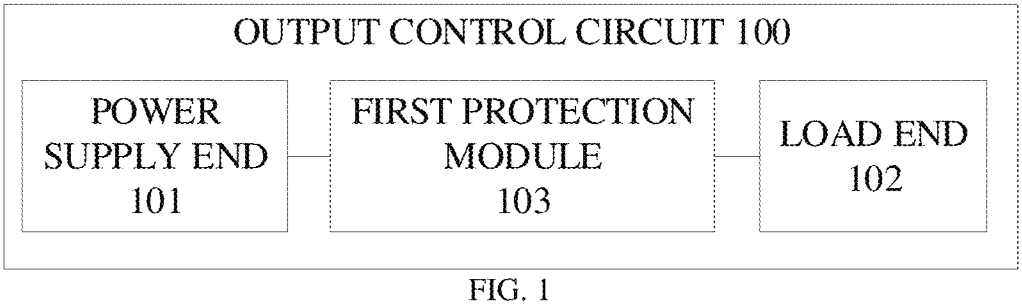
FIG. 1 is a schematic structural diagram illustrating an output control circuit provided in implementations of the present disclosure.

FIG. 1 is a schematic structural diagram illustrating an output control circuit provided in implementations of the present disclosure. Reference can be made to FIG. 1, and an output control circuit 100 can include a power supply end 101, a load end 102, and a first protection module 103. The power supply end 101 is configured to be connected with a power supply module, a load end 102 is configured to be connected with an external load device. The power supply end 101 is electrically connected with the load end 102 through the first protection module 103. The first protection module 103 is configured to disconnect an electrical connection between the power supply end 101 and the load end 102 or limit a current, based on a power supply state of the power supply module supplying power to the external load device.

The first protection module 103 configured to limit the current is configured to limit a current between the power supply end 101 and the load end 102, which makes a current of a pathway between the power supply end 101 and the load end 102 become small. When the current of the pathway between the power supply end 101 and the load end 102 is reduced to nearly zero, for user perception, it is equivalent to a disconnection between the power supply end 101 and the load end 102.

In the above implementations, the first protection module 103 is connected between the power supply end 101 and the load end 102. The power supply module can supply power to the external load device through the first protection module 103, such that power is supplied through the first protection module 103. The first protection module 103 can detect the power supply state and directly disconnect a connection between the power supply end 101 and the load end 102 based on the detected power supply state. It can be seen that, the first protection module 103 can monitor the power supply state and realize circuit control, such that the output control circuit 100 can control output of a power supply circuit. The output control circuit 100 has a simple structure, and circuit safety is effectively ensured.

Exemplarily, the power supply end 101, the load end 102, and the first protection module 103 constitute a current output loop for the power supply module to discharge to the external load device, and the first protection module 103 can control a power-on condition of the current output circuit. Therefore, the power supply module can be configured to discharge to the external load device through the output control circuit 100.

Exemplarily, the power supply module may include a power storage assembly which can store electric energy, such as a battery assembly, an electric cell assembly, etc. The external load device may include an automotive battery or an automotive engine. It can be understood that, the automotive battery includes, but is not limited to, a lead-acid battery, a lithium battery, a super capacitor, etc. For example, it is assumed that the battery assembly is a battery assembly included in an external emergency start power supply and the external load device is the automotive battery or the automotive engine, once the external emergency start power supply is properly connected with the output control circuit 100 through the power supply end 101 and the external load device is properly connected with the load end 102, the external emergency start power supply can discharge through the current output loop constituted by the power supply end 101, the first protection module 103, and the load end 102, in other words, the external emergency start power supply can provide an emergency start power supply for the automotive battery or the automotive engine. It can also be understood that, the external emergency start power supply is configured to charge the automotive battery or the automotive engine, therefore, a vehicle can also be started when the automotive battery is low.

Exemplarily, the power supply end 101 includes a first power supply end and a second power supply end, the load end 102 includes a first load end and a second load end, and the first protection module 103 is connected between the first power supply end and the first load end. The first power supply end may be a positive end BAT+ of a power supply and configured to be connected with a positive electrode of the power supply module; the first load end may be a positive end CAR+ of a load and configured to be connected with a positive electrode of the external load device. The first power supply end may also be a negative end BAT− of the power supply and configured to be connected with a negative electrode of the power supply module; the first load end may also be a negative end CAR+ of the load and configured to be connected with the negative electrode of the external load device.

Figure 2:
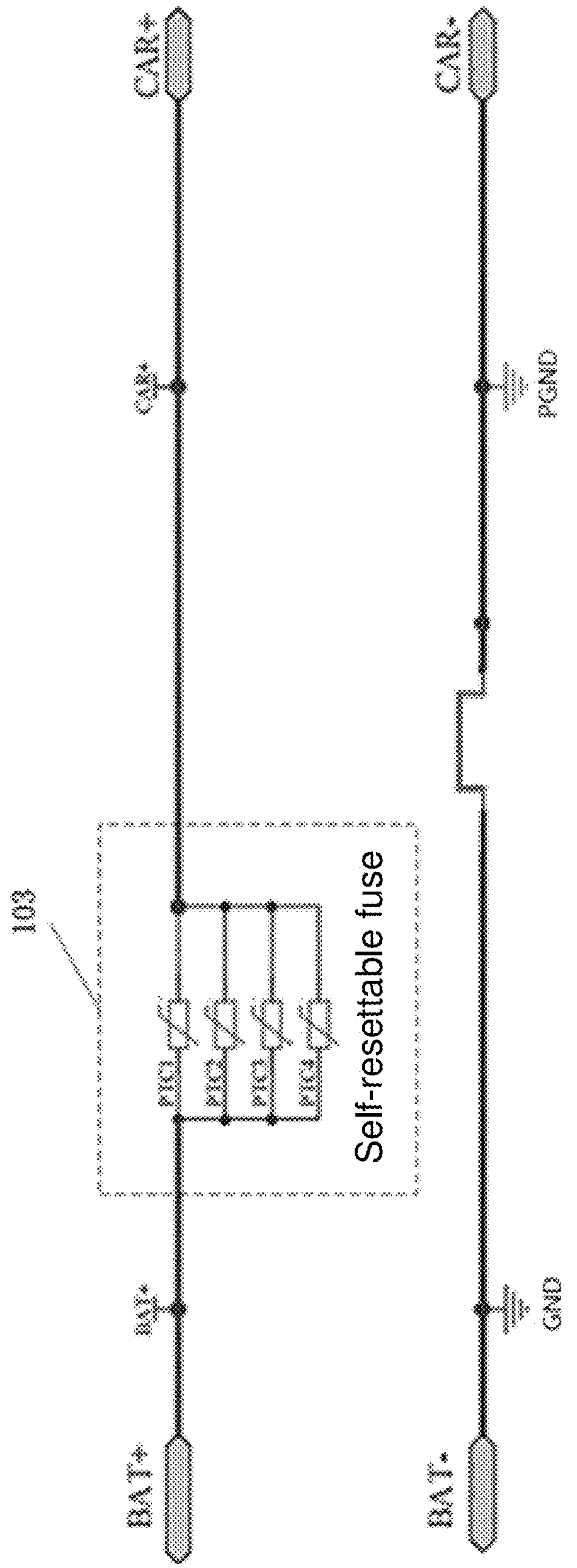
FIG. 2 is a schematic structural diagram illustrating an output control circuit provided in other implementations of the present disclosure.

Reference can be made to FIG. 2, for example, the first power supply end is the positive end BAT+ of the power supply and the first load end is the positive end CAR+ of the load, the power supply end 101 includes the positive end BAT+ of the power supply and the negative end BAT− of the power supply, the positive end BAT+ of the power supply is configured to be connected with the positive electrode of the power supply module, and the negative end BAT− of the power supply is configured to be connected with the negative electrode of the power supply module. The load end 102 includes the positive end CAR+ of the load and the negative end CAR− of the load, the positive end CAR+ of the load is configured to be connected with the positive electrode of the external load device, the negative end CAR− of the load is configured to be connected with the negative electrode of the external load device, and the negative end CAR− of the load is also configured to be connected with a first ground end PGND. The power supply module is connected with the output control circuit 100 through the power supply end 101, so as to provide an operating voltage for the output control circuit 100, and provide power for the external load device through the first protection module 103. It can be understood that, when the output control circuit 100 is applicable to the emergency start power supply, the power supply module includes a built-in power supply module of the emergency start power supply. When the output control circuit 100 is applicable to the battery clip, the battery clip may be fixedly connected with the power supply module as a part of the power supply module, or the battery clip may also be pluggably connected with the power supply module as an accessory of the power supply module. The power supply module may include the battery assembly such as the emergency start power supply or other energy storage power supply devices, and the battery clip may be pluggably connected with an external device.

In an implementation, the power supply state includes a power supply parameter, and the power supply parameter includes at least one of: a power supply current or a power supply voltage. The electrical connection between the power supply end 101 and the load end 102 is disconnected or the current is limited based on the power supply state of the power supply module supplying power to the external load device includes that the electrical connection between the power supply end 101 and the load end 102 is disconnected or the current is limited, based on a value of the power supply parameter. Therefore, the first protection module 103 can disconnect the connection between the power supply end 101 and the load end 102, based on the power supply parameter and a power supply duration, which helps to realize circuit protection functions, such as overvoltage protection, overcurrent protection, short-circuited protection, or reverse connection protection.

In an implementation, the power supply state includes a power supply duration. The electrical connection between the power supply end 101 and the load end 102 is disconnected or the current is limited based on the power supply state of the power supply module supplying power to the external load device includes that the electrical connection between the power supply end 101 and the load end 102 is disconnected or the current is limited, based on the power supply duration. Therefore, the first protection module 103 can disconnect the connection between the power supply end 101 and the load end 102, based on the power supply duration, which helps to solve a problem of high temperature caused by excessive power supply time.

Exemplarily, a temperature of the first protection module 103 is related to the power supply state. The first protection module 103 is configured to monitor the power supply state of the power supply module supplying power to the external load device, and disconnect the electrical connection between the power supply end 101 and the load end 102 or limit the current, based on the temperature of the first protection module 103. For different power supply states, the first protection module 103 will have different temperatures, for example, when a power supply current exceeds a preset current threshold, the temperature of the first protection module 103 increases as the power supply current increases, such that the power supply current can be determined to increase according to an increasing temperature. Therefore, the first protection module 103 can directly disconnect the electrical connection between the power supply end 101 and the load end 102 or limit the current based on the first protection module 103's own temperature abnormity, thereby disconnecting the electrical connection between the power supply end 101 and the load end 102 or limit the current based on the power supply state.

Exemplarily, the connection between the power supply end 101 and the load end 102 is disconnected based on the temperature of the first protection module 103 includes that the connection between the power supply end 101 and the load end 102 is disconnected, in response to the temperature of the first protection module 103 being not corresponding to a preset temperature range. Exemplarily, the preset temperature range may include temperatures less than a preset temperature threshold. When the temperature of the first protection module 103 reaches the preset temperature threshold, the first protection module 103 is triggered to disconnect the connection between the power supply end 101 and the load end 102.

In an implementation, the connection between the power supply end 101 and the load end 102 is disconnected based on the power supply state of the power supply module supplying power to the external load device includes that the connection between the power supply end 101 and the load end 102 is disconnected, in response to a value of the power supply current being greater than the preset current threshold and power supply duration of the power supply current being not less than response time, where the response time is negatively correlated with the value of power supply current. Therefore, for an abnormal current, the abnormal current with greater current value corresponds to less response time, and it needs to be faster to disconnect a circuit or limit a current, which can more effectively protect the circuit.

In an implementation, the first protection module 103 is further configured to keep a normal electrical connection between the power supply end 101 and the load end 102, to realize normal power supply, in response to the value of the power supply current being not greater than the preset current threshold.

In an implementation, on condition that the load end 102 is reversely connected with the external load device, a current value of the power supply module supplying power to the external load device is greater than the preset current threshold. Therefore, by setting the preset current threshold of the first protection module 103 in advance, when the external load device is reversely connected, a current value of supplying power is greater than the preset current threshold. When time of supplying current reaches a corresponding response time, the circuit or is disconnected or the current is limited to ensure safety of the circuit.

Exemplarily, reverse connections of the external load device include the followings. The positive end CAR+ of the load is connected with the negative electrode of the external load device, and the negative end CAR− of the load is connected with the positive electrode of the external load device, such that the positive electrode of the power supply module is connected with the negative electrode of the external load device through the positive end BAT+ of the power supply, and the negative electrode of the power supply module is connected with the positive electrode of the external load device through the negative end BAT− of the power supply. On condition that the external load device is reversely connected, when the power supply module discharges to an external load, the current is too large, and there is a safety problem in the circuit.

In an implementation, on condition that the load end 102 is short-circuited, a current value of the power supply module supplying power to the external load device is greater than the preset current threshold. Therefore, when the load end 102 is short-circuited, a current value of supplying power is greater than the preset current threshold, and the circuit is disconnected or the current is limited to ensure safety of the circuit when duration of supplying current reaches a corresponding response time.

Exemplarily, a short circuit of the load end 102 includes a direct connection between the positive end CAR+ of the load and the negative end CAR− of the load. A condition that leads to the direct connection between the positive end CAR+ of the load and the negative end CAR− of the load includes the following. A positive clip of the battery clip is directly connected with a negative clip of the battery clip, for example, a user clamps two clips together, or metal parts of the two clips accidentally touches and other misoperation.

Exemplarily, when the external load device is reversely connected or short-circuited, a current value of supplying power is greater than the preset current threshold, the temperature of the first protection module 103 continues to rise as a current continues to be output, when duration of continuous output of the current reaches the response time, the temperature of the first protection module 103 rises to the preset temperature threshold, which triggers the first protection module 103 to disconnect the electrical connection between the power supply end 101 and the load end 102 or limit the current.

In an implementation, on condition that the load end 102 is forwardly connected with the external load device, a current peak value of the power supply module supplying power to the external load device is greater than the preset current threshold, and power supply duration with the current peak value is less than response time for the current peak value.

Therefore, the output control circuit 100 is applicable to the emergency start power supply or the battery clip, which can ensure that when the power supply module can normally provide an instantaneous large current for the external load device through the output control circuit 100, a first protection module 103 keeps normal power-on between the power supply end 101 and the load end 102.

In an implementation, the connection between the power supply end 101 and the load end 102 is disconnected based on the power supply state of the power supply module supplying power to the external load device includes that the connection between the power supply end 101 and the load end 102 is disconnected or the current is limited, in response to the number of times of supplying power to the external load device per unit time for ignition of the external load device being greater than a preset number of times. The external load device includes the automotive battery or the automotive engine. Supplying power for ignition of the external load device is providing an emergency start power supply for the automotive battery or the automotive engine, which can also be understood as an operation that an external emergency start power supply charges the automotive battery or the automotive engine to start the vehicle. In a supplying power state of each output for ignition of the external load device, the temperature of the first protection module 103 rises due to an instantaneous large current or a relatively large current provided by the power supply module. After multiple ignition operations within a short time, the temperature of the first protection module 103 reaches the preset temperature threshold, which triggers the first protection module 103 to disconnect the connection between the power supply end 101 and the load end 102. Therefore, when the user ignites several times within a short time, the connection between the power supply end 101 and the load end 102 can be disconnected by the first protection module 103, such that circuit heating caused by repeated ignition and a potential circuit safety problem can be avoided.

In an implementation, a normal operating current allowed by the first protection module 103 is not less than 50 A.

In an implementation, a normal operating current allowed by the first protection module 103 is not less than 150 A.

In an implementation, a normal operating current allowed by the first protection module 103 is not less than 200 A.

In an implementation, after disconnecting the connection between the power supply end 101 and the load end 102, if a state of the first protection module 103 reaches a preset recovery condition, the first protection module 103 is further configured to restore a power-on state between the power supply end 101 and the load end 102. Therefore, the first protection module 103 can provide a recovery function, such that the output control circuit 100 can restore a normal output, and the first protection module 103 can continue to provide overcurrent protection for an output control current. In addition, the first protection module 103 can automatically restore the normal power-on state between the power supply end 101 and the load end 102, based on its own state, and realize its own control function without control of other hardware recognition circuits or software recognition circuits.

In an implementation, the preset recovery condition includes that the first protection module 103 has a temperature which is less than the preset temperature threshold. Therefore, when the temperature of the first protection module 103 decreases below the preset temperature threshold, the first protection module 103 can reconnect the connection between the power supply end 101 and the load end 102.

In an implementation, the first protection module 103 is configured to disconnect the electrical connection between the power supply end 101 and the load end 102 or limit the current, based on the power supply state of the power supply module supplying power to the external load device, on condition that the load end 102 is short-circuited.

The first protection module 103 is configured to switch from disconnecting the electrical connection between the power supply end 101 and the load end 102 or limiting the current to restoring the power-on state between the power supply end 101 and the load end 102, on condition that the load end 102 is switched from being short-circuited to having no load or being forwardly connected with the external load device.

In an implementation, the first protection module 103 includes a fuse element. Exemplarily, one end of the fuse element is connected with the power supply end 101, and the other end of the fuse element is connected with the load end 102. Therefore, a power supply current output by the power supply module to an external load end flows through the fuse element, such that the fuse element can monitor the power supply current.

In an implementation, the first protection module 103 includes at least two fuse elements which are connected in parallel between the power supply end 101 and the load end 102. Exemplarily, reference can be made to FIG. 2, the first protection module 103 includes four fuse elements PTC, i.e., a first fuse element PTC1, a second fuse element PCT2, a third fuse element PTC3, and a fourth fuse element PTC4, and the four fuse elements are connected in parallel between the positive end BAT+ of the power supply and the positive end CAR+ of the load. Therefore, the power supply current can be shunted to pass through each fuse element, which reduces requirements for current carrying capacity of a single fuse element.

In an implementation, the fuse element includes a self-resettable fuse element. The self-resettable fuse element, also known as a resettable fuse, is an overcurrent electronic protection element. The self-resettable fuse has dual functions of overcurrent-and-thermal protection and automatic recovery. Therefore, the circuit can be effectively protected without complex hardware recognition circuit and software recognition circuit, which avoids ineffective protection to the circuit due to a failure hardware recognition circuit or software recognition circuit. The circuit has a simple structure and high reliability.

Figure 3:
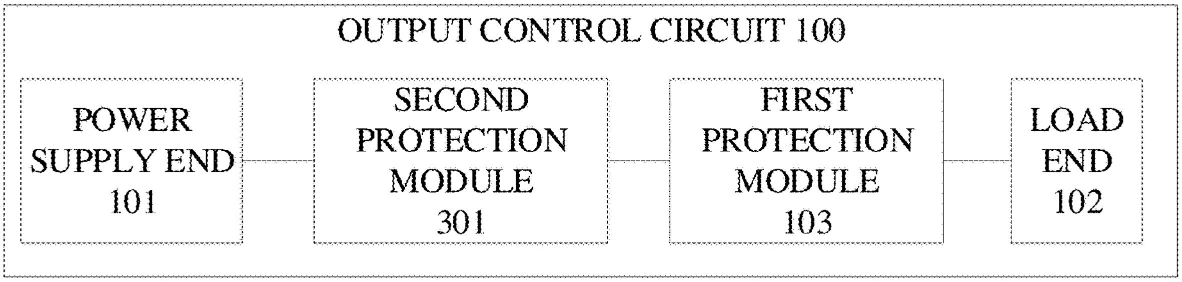
FIG. 3 is a schematic structural diagram illustrating an output control circuit provided in other implementations of the present disclosure.

In an implementation, reference can be made to FIG. 3, the output control circuit 100 further includes a second protection module 301, the power supply end 101 is connected with the load end 102 through the second protection module 301, and the second protection module 301 is configured to prevent the external load device from charging the power supply module. Exemplarily, under a normal condition, the second protection module 301 can only allow the current to pass in one direction. Take FIG. 4 as an example, it is assumed that the second protection module 301 is connected between the positive end BAT+ of the power supply and the positive end CAR+ of the load, the second protection module 301 only allows the current to flow from the positive end BAT+ of the power supply to the positive end CAR+ of the load, so as to prevent the external load device from charging the power supply module.

In an implementation, the second protection module 301 includes a unilateral conduction element. Therefore, the second protection module 301 can use the unilateral conduction element to prevent the external load device from charging the power supply module, without using other detecting circuits to recognize whether the current is reverse. The circuit structure is simple and easy to realize.

In an implementation, the second protection module 301 includes at least two unilateral conduction elements, and the at least two unilateral conduction elements are connected in parallel between the power supply end 101 and the load end 102. Exemplarily, reference can be made to FIG. 4, the second protection module 301 includes four unilateral conduction elements, i.e., a first unilateral conduction element D1, a second unilateral conduction element D2, a third unilateral conduction element D3, a fourth unilateral conduction element D4, and the four unilateral conduction elements are connected in parallel between the positive end BAT+ of the power supply and the positive end CAR+ of the load. Therefore, the power supply current can be shunted to pass through each unilateral conduction element, which reduces requirements for current carrying capacity of a single unilateral conduction element.

In an implementation, the unilateral conduction element includes a diode. Therefore, based on a unilateral conduction characteristic of the diode, the diode can be adopted as the unilateral conduction element, with simple circuit structure and low costs. Therefore, based on a circuit diagram illustrated in FIG. 4, the resettable fuse is used for overcurrent-and-shortcircuit protection, the diode is used for anti-reverse charging protection, a positive electrode of the diode is connected with the positive electrode of the power supply module, a negative electrode of the diode is connected with one end of the resettable fuse, and the other end of the resettable fuse is connected with the positive electrode of the load end 102. When the vehicle is started normally, because the diode has a function of preventing a reverse current, the automotive engine cannot reversely charge a product battery, which effectively protects the power supply module from generating a reverse charging current after the vehicle is started. Because the resettable fuse element is connected in series in the circuit, when an output current exceeds a protection value of the resettable fuse, the resettable fuse can limit the output current to reduce the current. Exemplarily, the resettable fuse can reduce the current to almost zero, which is equivalent to disconnection for the user. When the output current is restored to a normal value, the resettable fuse automatically returns to normal operation to avoid safety problems caused by outputting overcurrent or a short circuit.

In an implementation, the second protection module 301 includes at least two unilateral elements which are connected in parallel between the power supply end 101 and the load end 102.

In an implementation, the power supply end 101 includes a first power supply end and a second power supply end, and the load end 102 includes a first load end and a second load end. The first protection module 103 and the second protection module 301 are both connected between the first power supply end and the second power supply end, or the first protection module 103 is connected between the first power supply end and the first load end, and the second protection module 301 is connected between the second power supply end and the second load end.

In an implementation, the external load device includes the automotive battery or the automotive engine. Therefore, during a process that the power supply module supplies power for the vehicle to start, the output control circuit 100 can provide circuit protection.

In an implementation, the output control circuit 100 is applicable to an emergency start power supply device of the vehicle or a battery clip device of the vehicle. Exemplarily, the emergency start power supply device of the vehicle or the batter clip device of the vehicle is configured to supply power to the external load device, based on the output control circuit 100.

Figure 4:
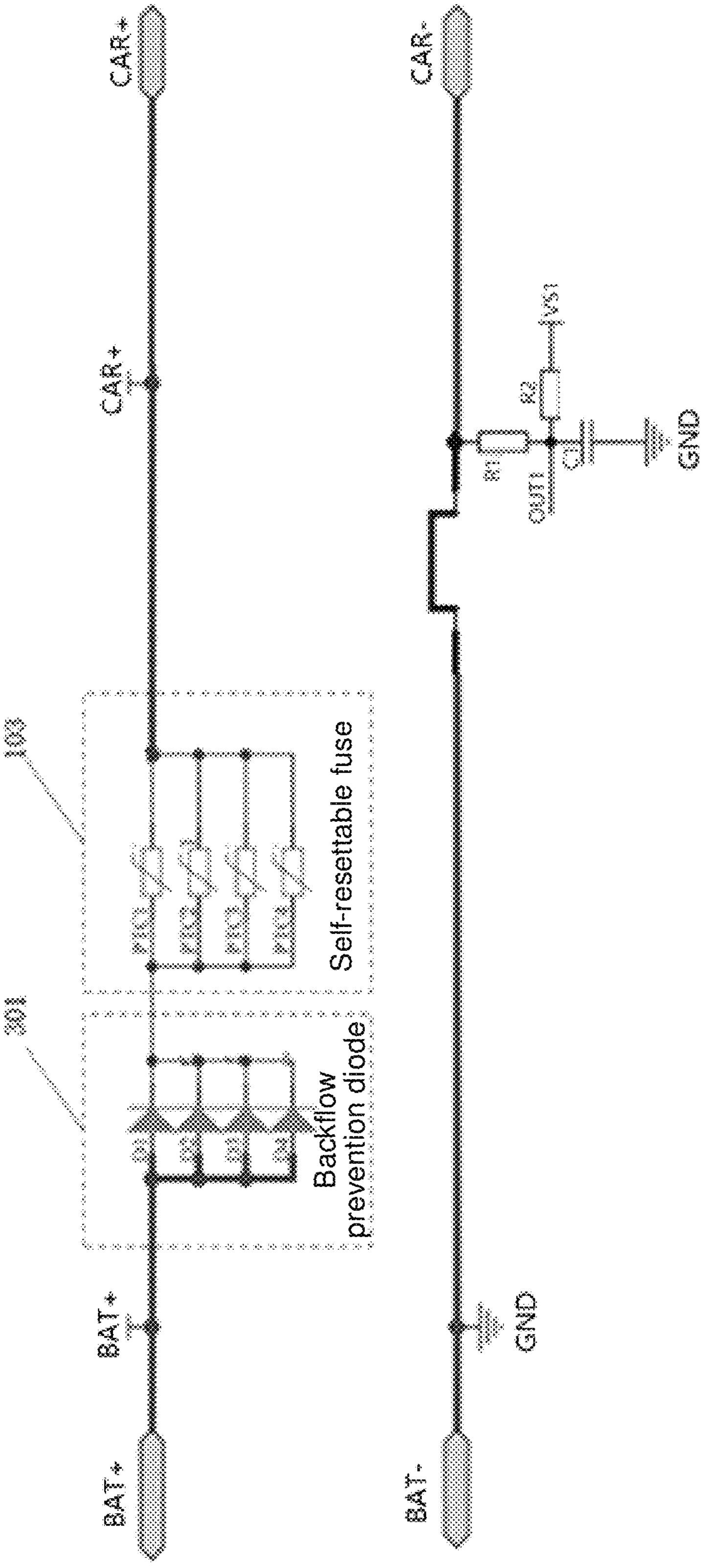
FIG. 4 is a schematic structural diagram illustrating an output control circuit provided in other implementations of the present disclosure.

Reference can be made to FIG. 4, a circuit example of an output control circuit 100 is illustrated, where the first power supply end is the positive end BAT+ of the power supply, the first load end is the positive end CAR+ of the load, and the first protection module 103 and the second protection module 301 are connected between the first power supply end and the first load end. In FIG. 4, the power supply end 101 includes the positive end BAT+ of the power supply and the negative end BAT− of the power supply, and the load end 102 includes the positive end CAR+ of the load and the negative end CAR− of the load. The positive end BAT+ of the power supply, the second protection module 301, the first protection module 103, and the positive end CAR+ of the load are connected in sequence, and the negative end BAT− of the power supply is connected with the negative end CAR− of the load. Under protection of the first protection module 103 and the second protection module 301, the power supply module can supply power to the external load device which is connected with the load end 102.

Figure 5:
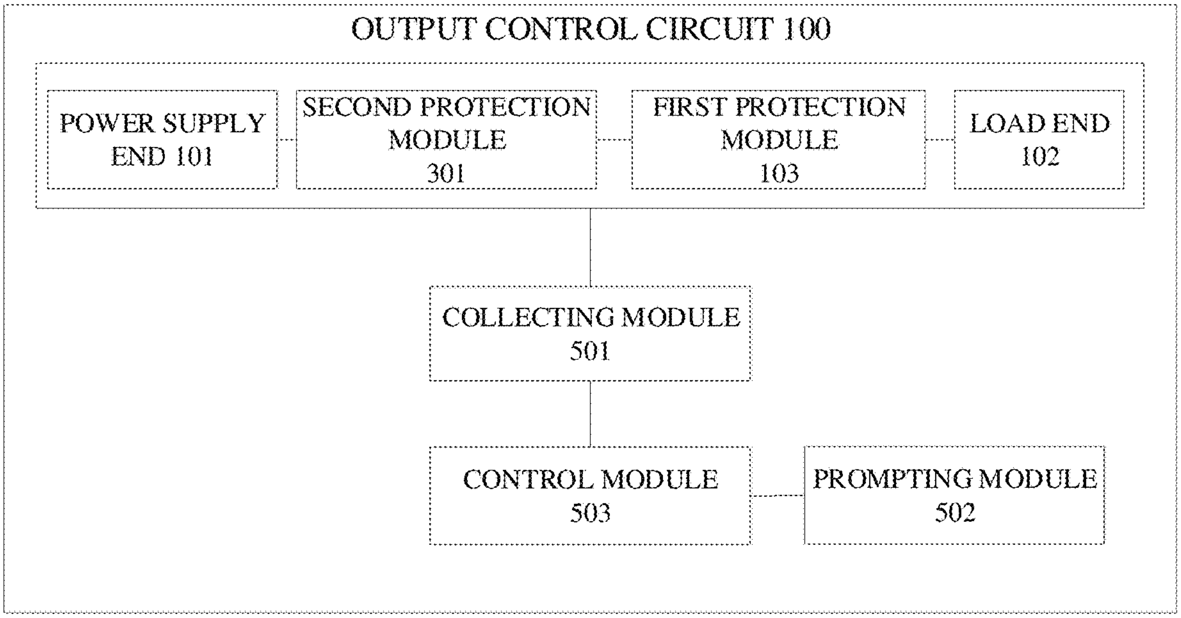
FIG. 5 is a schematic structural diagram illustrating an output control circuit provided in other implementations of the present disclosure.

In an implementation, reference can be made to FIG. 5, the output control circuit 100 further includes a collecting module 501 and a prompting module 502. The collecting module 501 is configured to collect a parameter of the output control circuit 100 and determine a detecting signal. The prompting module 502 is configured to trigger a prompting state corresponding to the detecting signal, where the prompting state is indictive of an operation state of the output control circuit 100. Exemplarily, the parameter of the output control circuit 100 may include at least one of: current, voltage, or temperature of the power supply module; current, voltage, or temperature of the external load device; current of a pathway between the power supply module the external load end; current, voltage, or temperature of the first protection module 103; current, voltage, or temperature of the second protection module 301. Therefore, through the collecting module 501 and the prompting module 502, the user can understand the operation state of the output control circuit 100 and take corresponding measures in time. For example, low voltage of the power supply module can reflect low electric quality of the power supply module, and the user can charge the power supply module in time. For another example, when the current of the pathway between the power supply module and the external load device is too large, the user can disconnect a connection with the external load device in time. When the output control circuit 100 does not include a switching module to control on-off of the pathway between the power supply end 101 and the load end 102, the collecting module 501 and the prompting module 502 are disposed to prompt the user in time, which is of great significance to protect the circuit.

In an implementation, reference can be made to FIG. 5, the output control circuit 100 further includes a control module 503. The control module 503 is configured to determine a prompting control signal based on the detecting signal, correspondingly, the prompting module 502 is configured to determine the prompting state based on the prompting control signal. As such, after the detecting signal is processed by the control module 503, the prompting control signal is generated to control a prompting state of the prompting module 502. In this way, data processing work of the prompting module 502 can be reduced, moreover, the control module 503 can also output a control signal after performing logical operation on at least two detecting signals, which realize more intelligent control.

Exemplarily, the control module 503 can adopt a programmable control device, such as a micro-controller unit (MCU), a field-programmable gate array (FPGA), or a digital signal processor (DSP), etc. The control module 503 is configured to perform logic operations and control, and the control module 503 can be responsible for data collection and data conversion, a logic operation, data communication, driving output, and other functions.

Exemplarily, on condition that the output control circuit 100 includes at least two collecting modules 501, control modes of the at least two collecting modules 501 to the prompting module 502 can be exemplified as follows: detecting signals of all collecting modules 501 directly control the prompting module 502; or the detecting signals of all collecting modules 501 control the prompting module 502 through the control module 503; or the detecting signals of at least one collecting module 501 directly control the prompting module 502, and detecting signals of the rest of collecting modules 501 control the prompting module 502 through the control module 503.

Figure 6:
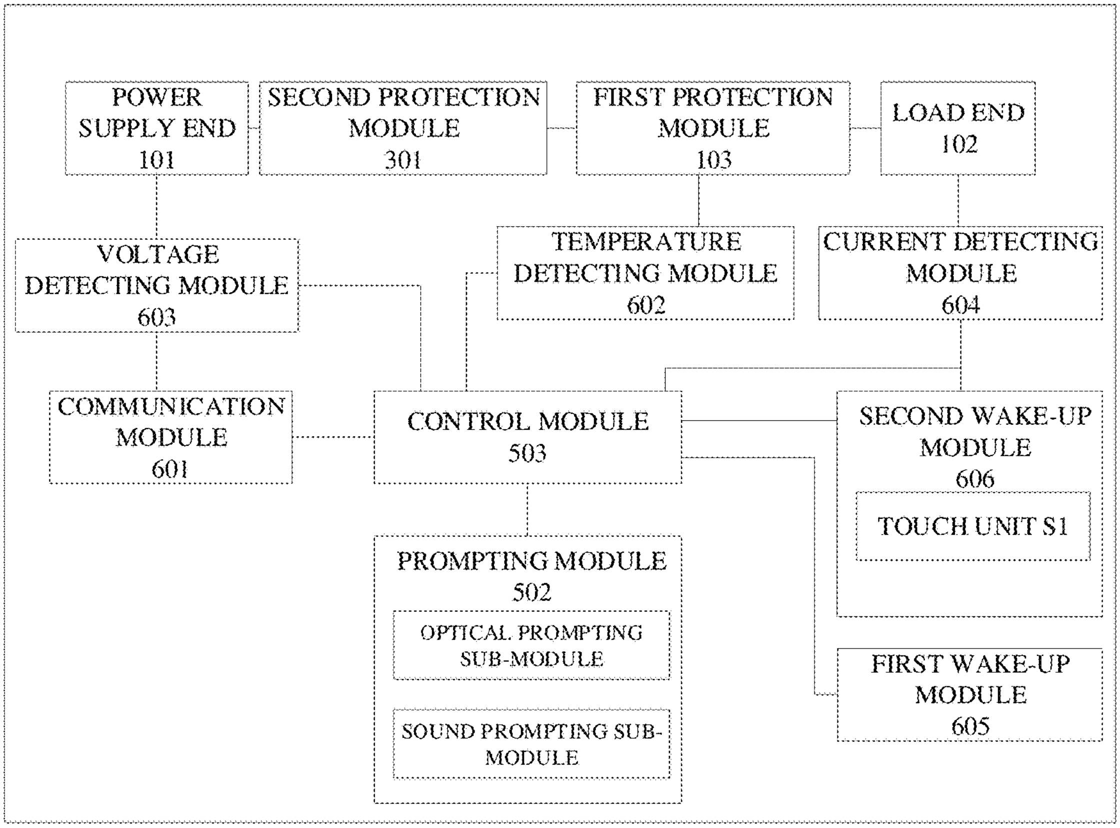
FIG. 6 is a schematic structural diagram illustrating an output control circuit provided in other implementations of the present disclosure.

In an implementation, reference can be made to FIG. 6, the collecting module 501 includes a communication module 601, the communication module 601 is configured to communicate with an access device of the output control circuit 100 to obtain a parameter of the access device, and determine a detecting signal of the access device based on the parameter of the access device. The detecting signal includes the detecting signal of the access device. The access device includes at least one of: the power supply module or the external load device.

Exemplarily, the power supply module can include a power supply module management unit which is configured to manage various parameter information of the power supply module, and the communication module 601 can communicate with the power supply module management unit to collect parameter values of an external device.

The communication unit 601 can communicate with a power supply module management unit, and the power supply module management unit is configured to collect parameter information of the power supply module which includes information of current, voltage, temperature, etc. Exemplarily, the power supply module management unit can be disposed in the emergency start power supply device.

Exemplarily, the parameter of the access device can include a present battery voltage, a maximum current output capacity, a battery temperature, an operating state, software version information, etc. of a battery assembly in the access device. The communication module 601 can generate a detecting signal according to obtained relevant information, and send the detecting signal to the control module 503, such that the control module 503 can output the prompting control signal based on the detecting signal. For example, the control module 503 can analyze electric quality of the power supply module based on the present battery voltage, and output the prompting control signal to prompt the electric quality of the power supply module, so as to prompt the user to charge.

In an implementation, reference can be made to FIG. 6, and the collecting module 501 includes a temperature detecting module 602. The temperature detecting module 602 is configured to collect a temperature of the first protection module 103 and determine a temperature detecting signal based on the temperature of the first protection module 103. The detecting signal includes the temperature detecting signal.

Exemplarily, the temperature detecting module 602 is configured to detect an operating temperature of the first protection module 103, generate the temperature detecting signal based on a detected temperature value, and feed the temperature detecting signal back to the control module 503. The control module 503 is also configured to analyze that whether the temperature of the first protection module 103 exceeds the preset temperature threshold according to a received temperature value, the control module 503 is configured to output the prompting control signal used for prompting that a temperature is too high to prompt the user to disconnect the connection between the power supply module and the external load device if the received temperature value exceeds the preset temperature threshold, so as to ensure safety of the circuit.

Figure 7:
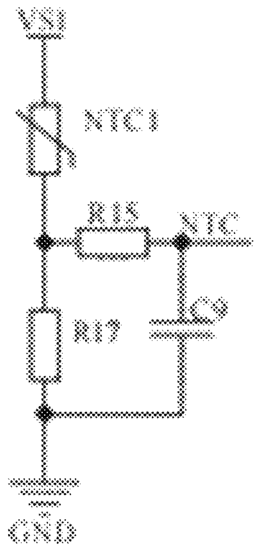
FIG. 7 is a schematic structural diagram illustrating a temperature detecting module in an output control circuit provided in implementations of the present disclosure.

Exemplarity, a thermistor NTC has a characteristic that resistance of the thermistor NTC decreases as a temperature increases, such that the temperature detecting module 602 can use the thermistor NTC to sense the temperature of the first protection module 103. The thermistor NTC and another resistor constitute a voltage dividing circuit, and a temperature of the thermistor NTC is determined based on an electrical signal of a voltage dividing node of the voltage dividing circuit, so that the temperature of the first protection module 103 can be speculated. Reference can be made to FIG. 7, which is a schematic structural diagram illustrating one optional circuit of the temperature detecting module, and the temperature detecting module 602 includes a thermistor NTC1, a first resistor R17, a second resistor R15, and a first capacitor C9. The thermistor NTC1 is configured to receive a voltage signal through its first end, and the voltage signal can be provided by an output end VS1 of the control module 503. A second end of the thermistor NTC1 is respectively connected with a first end of the first resistor R17 and a first end of the second resistor R15. A second end of the first resistor R17 is grounded, a second end of the second resistor R15 is grounded through the first capacitor C9, and the second resistor R15 is configured to output a temperature detecting signal through its second end.

In an implementation, reference can be made to FIG. 6, and the collecting module 501 includes a voltage detecting module 603. The voltage detecting module 603 is configured to collect a voltage of the power supply end 101, and determine a voltage detecting signal based on the voltage of the power supply end 101. The detecting signal includes the voltage detecting signal.

Figure 8:
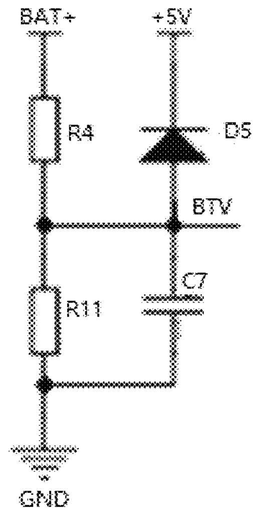
FIG. 8 is a schematic structural diagram illustrating a voltage detecting module in an output control circuit provided in implementations of the present disclosure.

Exemplarily, the voltage detecting module 603 is connected with the power supply end 101 and is configured to generate the voltage detecting signal based on a detected voltage and feed the voltage detecting signal back to the control module 503. The control module 503 is also configured to analyze the electric quantity of the power supply module according to a received voltage detecting signal, and output the prompting control signal to prompt the electric quantity of the power supply module, so as to prompt the user to charge. Reference can be made to FIG. 8, which is a schematic structure diagram illustrating one optional circuit of the voltage detecting module, and the voltage detecting module 603 includes a voltage dividing circuit, an input end of the voltage dividing circuit is connected with the first power supply end, an output end of the voltage dividing circuit is grounded. The voltage dividing circuit includes a third resistor R4 and a fourth resistor R11, a first end of the third resistor R4 is connected with the positive end BAT+ of the power supply, a second end of the third resistor R4 is connected with a first end of the fourth resistor R11, and a second end of the fourth resistor R11 is connected with the negative end BAT− of the power supply (i.e., grounded). In addition, the voltage detecting module 603 further includes a second capacitor C7 and a first diode D5. A first end of the second capacitor C7 is connected with the first end of the fourth resistor R11, a second end of the second capacitor C7 is connected with the second end of the fourth resistor R11, a first end of the first diode D5 is connected with the first end of the fourth resistor R11, and a second end of the first diode D5 is connected with a first end of a regulated voltage (FIG. 8 takes power supply of +5V as an example). The regulated voltage can be provided by a regulated-voltage power supply module. In FIG. 8, the fourth resistor R11 is configured to output the voltage detecting signal through its first end.

In an implementation, reference can be made to FIG. 6, and the collecting module 501 includes a current detecting module 604. The current detecting module 604 is configured to collect a current value of the pathway between the power supply end 101 and the load end 102 and determine a current detecting signal. The detecting signal includes the current detecting signal.

Exemplarily, the current detecting signal output by the current detecting module 604 is fed back to the control module 503. The control module 503 is configured to analyze that whether there is a current or whether the current value is abnormal according to the current detecting signal, so as to determine whether the load is connected or whether the load is abnormally connected (such as reverse connection, short circuit, etc.), so as to output a corresponding prompting control signal.

Exemplarily, a designer can select, in a pathway between the first power supply end and the first load end, two points as two preset nodes, or select, in a pathway between the second power supply end and the second load end, two points as the two preset nodes. After the two preset nodes are determined, impedance between the two preset nodes is determined, in other words, a proportional relationship between a voltage value between the two preset nodes and a current value of a current passing through the two preset nodes is also determined. Therefore, the current detecting module 604 can detect a current by detecting the voltage value between the two preset nodes.

Optionally, the current detecting module 604 includes an amplifying unit. An input end of the amplifying unit is connected between the two preset nodes in the pathway between the power supply end 101 and the load end 102. The amplifying unit is configured to amplify the current between the two preset nodes to obtain the current detecting signal, and the current detecting signal is output through an output end of the amplifying unit.

Figure 9:
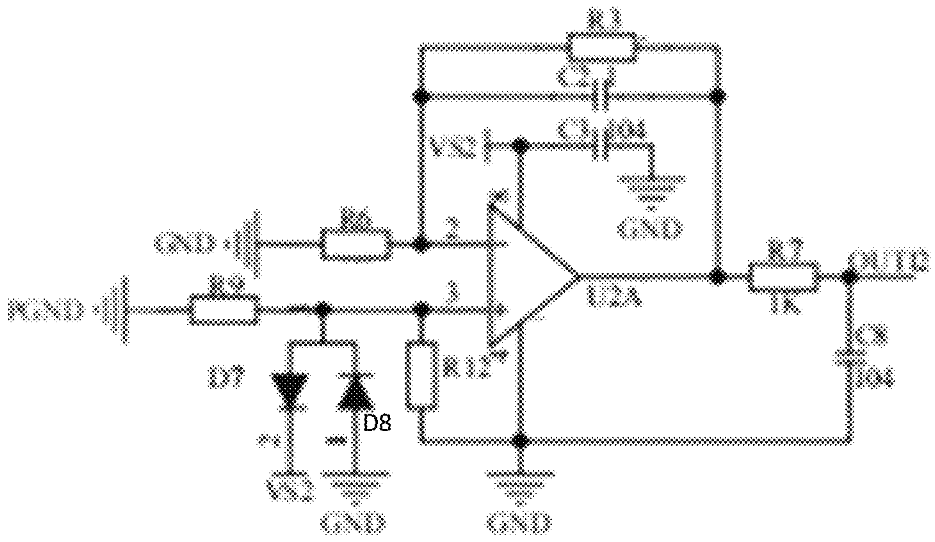
FIG. 9 is a schematic structural diagram illustrating a current detecting module in an output control circuit provided in implementations of the present disclosure.

Reference can be made to FIG. 9, which is a schematic structural diagram illustrating one optional circuit of the current detecting module 604, and a first preset node PGND and a second preset node GND are selected in the pathway between the power supply end 101 and the load end 102 (reference can be made to FIG. 2). The current detecting module 604 may include an amplifying unit which includes an amplifier U2A, a fifth resistor R3, a sixth resistor R6, an eighth resistor R9, and a ninth resistor R12. A second input end of the amplifier U2A (an inverting input end in FIG. 9) is connected with the second preset node GND through the sixth resistor R6, and is also connected with an output end of the amplifier U2A through the fifth resistor R3. A first input end of the amplifier U2A (a non-inverting input end in FIG. 9) is connected with the first preset node PGND through the eighth resistor R9, and is also connected with a first end of the ninth resistor R12. A second end of the ninth resistor R12 is grounded. Resistance values of the sixth resistor R6 and the eighth resistor R9 are the same, and resistance values of the fifth resistor R3 and the ninth resistor R12 are the same. Based on the above circuit diagram, the amplifying unit can amplify a voltage between the first preset node PGND and the second preset node GND, and an amplifying ratio is determined based on a resistance ratio of the fifth resistor R3 to the sixth resistor R6. Optionally, the current detecting module 604 may further include a third capacitor C2, a fourth capacitor C3, a fifth capacitor C8, a third diode D7, and a fourth diode D8. The second input end of the amplifier U2A (the inverting input end in FIG. 9) is connected with the second preset node GND through the sixth resistor R6, and is also connected with the output end of the amplifier U2A through the third capacitor C2. The output end of the amplifier U2A is connected with a first end of a seventh resistor R7, and a second end of the seventh resistor R7 is grounded through the fifth capacitor C8. The first input end of the amplifier U2A is also connected with a first end of the third diode D7 (an anode in FIG. 9) and a first end of the fourth diode D8 (a cathode in FIG. 9), a second end of the third diode D7 is connected with an output end VS2 of the control module 503, and a second end of the fourth diode D8 is grounded. In addition, a positive power supply end 101 of the amplifier U2A is connected with the output end VS2 of the control module 503 and a first end of the fourth capacitor C3 respectively, a second end of the fourth capacitor C3 is grounded, and a negative power supply end 101 of the amplifier U2A is grounded. In FIG. 9, the seventh resistor R7 is configured to output a current detecting signal through its second end. The current detecting module 604 provided in FIG. 9 can amplify electrical signals between the two preset nodes in a certain ratio based on the amplifying unit, so as to detect a small current between the power supply end 101 and the load end 102.

Exemplarily, another optional circuit of the current detecting module 604 is illustrated in FIG. 4. The current detecting module 604 may include a first bias resistor R1, a second bias resistor R2, and a current detecting port OUT1. A first end of first bias resistor R1 is connected with the first preset node, a second end of the first bias resistor R1 is connected with a first end of the second bias resistor R2, the first end of the second bias resistor R2 is connected with the current detecting port OUT1, a second end of the second bias resistor R2 is connected with a regulated voltage (such as a power supply with a voltage of +5V), the current detecting port OUT1 is configured to output a current detecting signal, and the second preset node is grounded. In an initial state (the output control circuit 100 is neither in a discharge state nor in a reverse charge state), a voltage value divided by the first bias resistor R1 and the second bias resistor R2 is obtained as an initial voltage value. It is assumed that when a value of the current detecting signal is greater than the initial voltage value, a loop is in the discharge state, an output current is in direct proportion to the value of the current detecting signal; when the value of the current detecting signal is less than the initial voltage value, the loop is in the reverse charge state. Based on the current detecting module 604, a loop discharge state and an output current can be detected.

Figure 10:
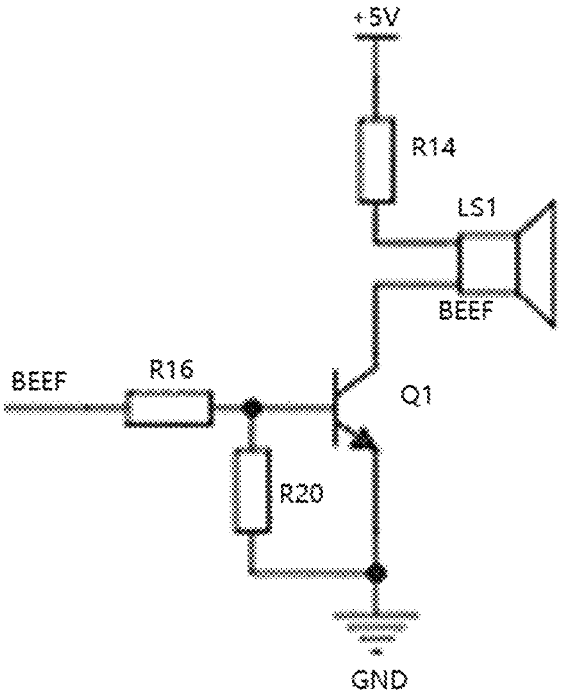
FIG. 10 is a schematic structural diagram illustrating a sound prompting sub-module in an output control circuit provided in implementations of the present disclosure.

Exemplarily, a sound prompting sub-module includes at least one of: a buzzer or a horn, and the sound prompting sub-module can be connected with the control module 503, so as to give an alarm prompt based on the prompting control signal of the control module 503. Reference can be made to FIG. 10, which is a schematic structural diagram illustrating one optional circuit of the sound prompting sub-module, and the sound prompting sub-module includes a buzzer LS1, a twelfth resistor R16, a switching unit Q1, a thirteenth resistor R14, and a fourteenth resistor R20. A first end of the buzzer is connected with a regulated voltage of +5V through the thirteenth resistor R14, a second end of the buzzer is connected with a first end of the switching unit Q1, a second end of the switching unit Q1 is grounded, a control end of the switching unit is connected with the control module 503 through the twelfth resistor R16 to receive the prompting control signal of the control module 503, a first end of the fourteenth resistor R20 is connected with the control end of the switching unit, and a second end of the fourteenth resistor R20 is connected with the second end of the switching unit Q1. By controlling a switching state of the switching unit, the prompting control signal is used to control an operating state of the buzzer.

In an implementation, the prompting module 502 includes at least one of: a sound prompting sub-module or an optical prompting sub-module.

Figure 11:
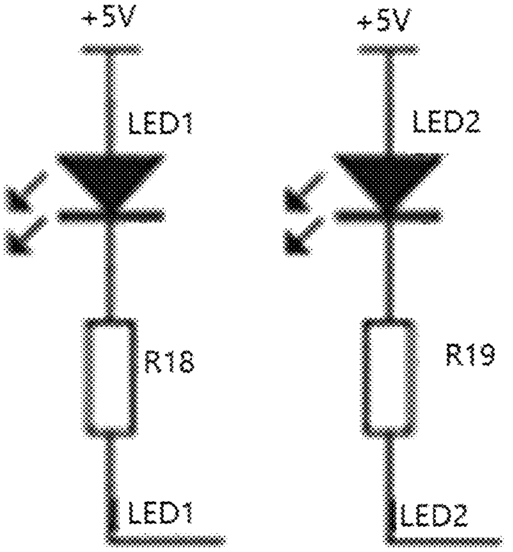
FIG. 11 is a schematic structural diagram illustrating an optical prompting sub-module in an output control circuit provided in implementations of the present disclosure.

Exemplarily, reference can be made to FIG. 11, which is a schematic structural diagram illustrating one optional circuit of the optical prompting sub-module, and the optical prompting sub-module may include a first optical unit and a second optical unit. The first optical unit includes a first light-emitting element LED1 and a tenth resistor R18, and the first light-emitting element LED1 and the tenth resistor R18 are connected in series between the regulated voltage and an output end of the prompting control signal of the control module 503. The second optical unit includes a second light-emitting element LED2 and an eleventh resistor R19, and the second light-emitting element LED2 and the eleventh resistor R19 are connected in series between the regulated voltage and the output end of the prompting control signal of the control module 503. The first light-emitting element LED1 and the second light-emitting element LED2 may have different light-emitting colors, for example, the first light-emitting element LED1 is green, and the second light-emitting element LED2 is red. A lit LED1 indicates that outputting power supply is normal, and a lit LED2 indicates that outputting power supply is abnormal.

Figure 12:
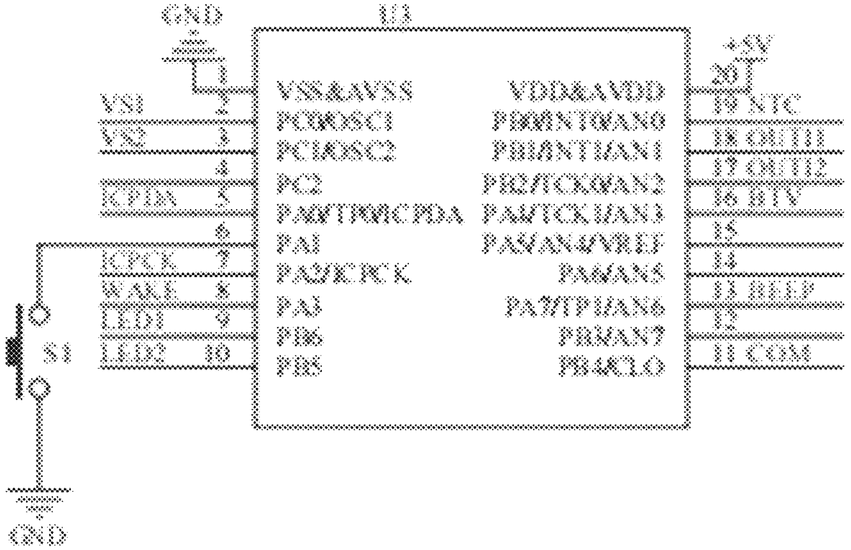
FIG. 12 is a schematic structural diagram illustrating a control module in an output control circuit provided in implementations of the present disclosure.

Exemplarily, the control module 503 may include at least two ports for outputting prompting control signal, for example, corresponding to prompting modules of FIG. 10 and FIG. 11, ports of the prompting control signal of the control module 503 illustrated in FIG. 12 include a port 9 (LED1), a port 10 (LED2), and a port 13 (BEEP).

Exemplarily, reference can be made to FIG. 12, which is a schematic structural diagram illustrating one optional circuit of the control module 503, and the control module 503 includes a microcontroller U3. The microcontroller U3 includes multiple signal ports which are configured to input and output corresponding signals, and input or output function performed by each signal port can be set in advance. For example, a port 19 (NTC) is configured to receive the temperature detecting signal input by the temperature detecting module 602.

In an implementation, reference can be made to FIG. 6, and the output control circuit 100 further includes at least one of: a first wake-up module 605 or a second wake-up module 606.

The first wake-up module 605 is configured to generate a first wake-up signal based on the current detecting signal of the pathway between the power supply end 101 and the load end 102, where the first wake-up signal is used to wake up the control module 503.

The second wake-up module 606 includes a touch unit S1 and is configured to generate a second wake-up signal in response to a touch operation for the touch unit S1, where the second wake-up signal is used to wake up the control module 503.

In an implementation, the first wake-up module 605 is further configured to obtain a reference signal, and generate the first wake-up signal on condition that value of the current detecting signal is greater than value of the reference signal.

Exemplarily, the first wake-up module 605 can be configured to collect a current value of the pathway between the power supply end 101 and the load end 102, and generate the first wake-up signal on condition that a collected current value is greater than a preset current value.

Exemplarily, the first wake-up module 605 can also be configured to obtain a current value of the pathway between the power supply end 101 and the load end 102 collected by the current detecting module 604. Reference of the current detecting module 604 can be made to FIG. 9, the current detecting module 604 can be configured to collect the current value of the path between the power supply end 101 and the load end 102 and generate a current detecting signal. The first wake-up module 605 is configured to generate the first wake-up signal in response to the current value in the current detecting signal being greater than the preset current value, after receiving the current detecting signal. If the output control circuit further includes a prompting module 502, the current detecting module 604 can also be configured to control a prompting state of the prompting module 502. The output control circuit can also be provided with two current detecting modules 604, one of which is configured to provide the current detecting signal to the first wake-up module 605, the other of which is configured to provide the current detecting signal to trigger the prompting module 502, and the two current detecting modules 604 may have different circuit structures.

Exemplarily, the first wake-up module 605 includes a first input end, a second input end, and a comparing unit. The first input end is configured to obtain the current detecting signal of the pathway current between the power supply end 101 and the load end 102. The second input end is configured to obtain the reference signal provided by the control module 503. The comparing unit is configured to output the first wake-up signal based on the current detecting signal and the reference signal. For example, on condition that a value of the current detecting signal is greater than a value of the reference signal, the first wake-up signal is output.

Figure 13:
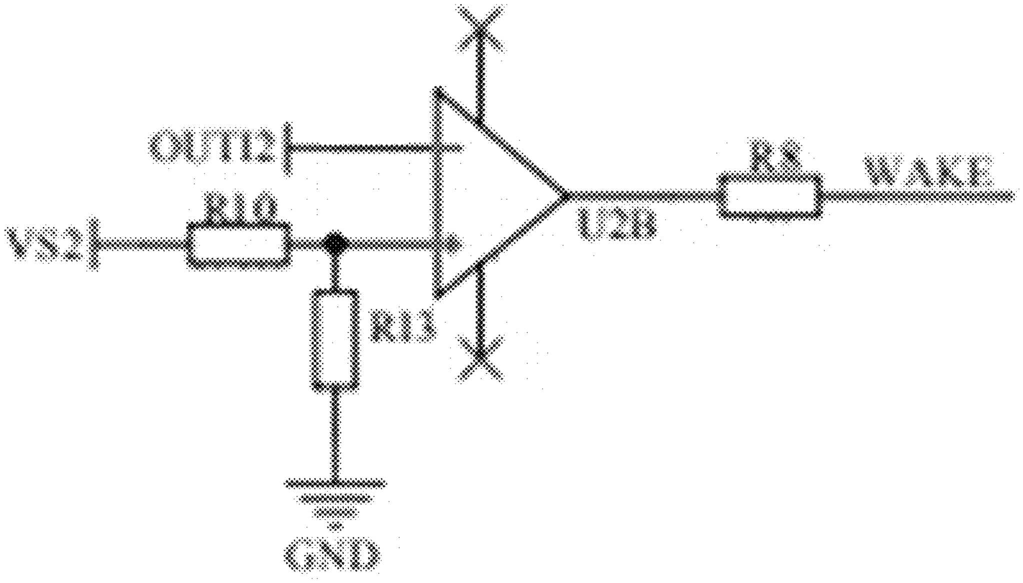
FIG. 13 is a schematic structural diagram illustrating a first wake-up module in a control module in an output control circuit provided in implementations of the present disclosure.

Exemplarily, reference can be made to FIG. 13, and the first wake-up module 605 further includes a fifteenth resistor R10, a sixteenth resistor R13, and a seventeenth resistor R8. The comparing unit includes a comparator U2B. An inverting input end of the comparator U2B is connected with a first input end OUT2, and the first input end OUT2 can be configured to receive the current detecting signal output by the current detecting module 604. A non-inverting input end of the comparator U2B is connected with a second input end through the fifteenth resistor R10, the second input end can be connected with the output end VS2 of the control module 503, and the non-inverting input end of the comparator U2B is also grounded through the sixteenth resistor R13. The fifteenth resistor R10 and the sixteenth resistor R13 are configured to convert a voltage value for a first signal, so as to obtain the first signal of a target voltage value to be input to the comparator U2B. An output end of the comparator U2B is connected with a first end of the seventeenth resistor R8, and a second end of the seventeenth resistor R8 is connected with the control module 503, so as to output the first wake-up signal to the control module 503.

In an implementation, in the second wake-up module 606, a first end of the touch unit S1 is connected with a second wake-up signal input end of the control module 503, and a second end of the touch unit S1 is grounded.

Figure 14:
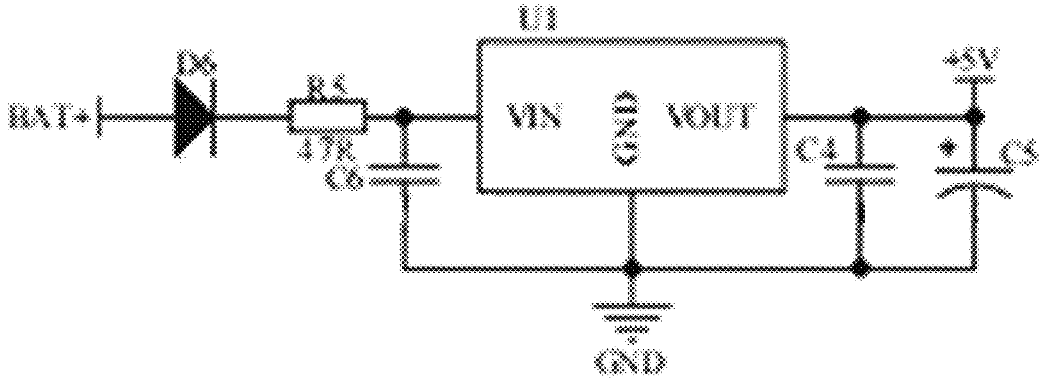
FIG. 14 is a schematic structural diagram illustrating a regulated-voltage power supply module provided in implementations of the present disclosure.

In an implementation, the output control circuit 100 may further include a regulated-voltage power supply module. The regulated power supply module is configured to provide a regulated voltage, and supply power to at least one of: the control module 503, the collecting module 501, the communication module 601, a first prompting module, or a second prompting module. Reference can be made to FIG. 14, which is an optional circuit diagram of a regulated-voltage power supply module, an input voltage of the regulated-voltage power supply module can be supplied by the power supply end 101, and the regulated-voltage power supply module can be configured to output a regulated voltage through its output end, where the regulated voltage may be +5V in FIG. 14. The regulated-voltage power supply module includes at least one voltage regulator U1.

In an implementation, the first protection module 103 does not include a relay, a mechanical switch, an electronic switch, or a switching tube.

In an implementation, at least the power supply end 101, the first protection module 103, and the load end 102 constitute a first circuit loop. The first circuit loop does not include the relay, the mechanical switch, the electronic switch, or the switching tube.

In an implementation, at least the power supply end 101, the first protection module 103, and the load end 102 constitute the first circuit loop. The first circuit loop is configured to implement that the power supply module supplying power to the external load device is only controlled by the first protection module 103.

In an implementation, the output control circuit 100 does not include the control module 503, or the output control circuit 100 includes the control module 503, and the control module 503 is not configured to control the first protection module 103.

In an implementation, a ground end of the output control circuit 100 may include the negative end BAT− of the power supply of the power supply end 101 or a circuit node connected with the negative end BAT− of the power supply (such as a node GND illustrated in FIG. 2).

In an implementation, the output control circuit 100 is applicable to the emergency start power supply device of the vehicle or the battery clip device of the vehicle.

In summary, the output control circuit 100 provided in implementations of the present disclosure, on the basis of adopting the self-resettable fuse as a protection device of the output control circuit 100, adds a diode protection device in a loop to prevent the product battery from being charged by the automotive engine, after vehicle start is completed. Since product output control does not require software control and management, and control and protection are completed by hardware, stability and reliability of the product can be greatly improved, which makes product performance more reliable and stable, compared with a solution of the MCU controlling electronic switching. In addition, the output control circuit 100 may also include one or more of: the voltage detecting module 603, the temperature detecting module 602, the control module 503, the regulated-voltage power supply module, the first wake-up module 605, the second wake-up module 606, the communication module

601, a sound prompting sub-module, an optical prompting sub-module, a current detecting circuit, or other peripheral modules, which provides functions such as circuit abnormality prompt, or control module 503 wake-up, etc., thereby improving safety of use and user experience.

Figure 15:
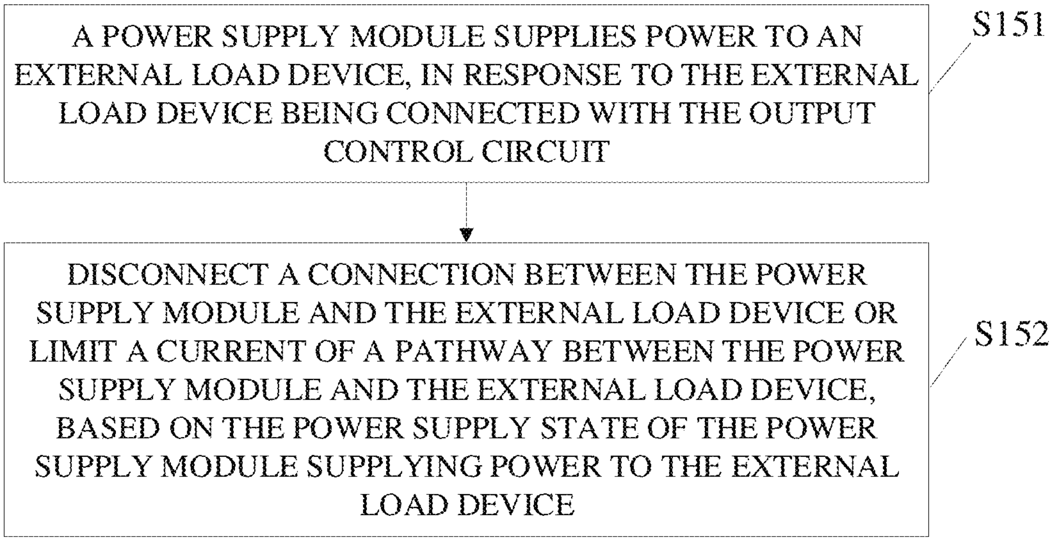
FIG. 15 is schematic flowchart illustrating an output control method provided in implementations of the present disclosure.

In addition, reference can be made to FIG. 15, and an output control method is further provided in implementations of the preset disclosure. The output control method is applicable to the output control circuit 100 provided in implementations of the preset disclosure, and the method includes the followings.

S151, a power supply module supplies power to an external load device, in response to the external load device being connected with the output control circuit 100.

S152, a connection between the power supply module and the external load device is disconnected or a current of a pathway between the power supply module and the external load device is limited, based on the power supply state of the power supply module supplying power to the external load device.

At S152, at least one of the following situations are included.

In response to the external load device being reversely connected, the first protection module 103 disconnects the connection between the power supply module and the external load device or limit the current of the pathway between the power supply module and the external load device.

In response to the load end 102 being short-circuited, the first protection module 103 disconnects the connection between the power supply module and the external load device or limit the current of the pathway between the power supply module and the external load device.

In response to the external load device being forwardly connected, the power supply module normally supplies power to the external load device through the first protection module 103.

In response to the number of times of supplying power to the external load device per unit time for ignition of the external load device being greater that a preset number of times, the connection between the power supply module and the external load device is disconnected or the current of the pathway between the power supply module and the external load device is limited.

The output control method provided in implementations of the present disclosure can be realized based on the output control circuit 100 provided in implementations of the present disclosure. Reference of descriptions of the output control circuit 100 can be made to corresponding implementations, which will not be repeated here.

Figure 16:
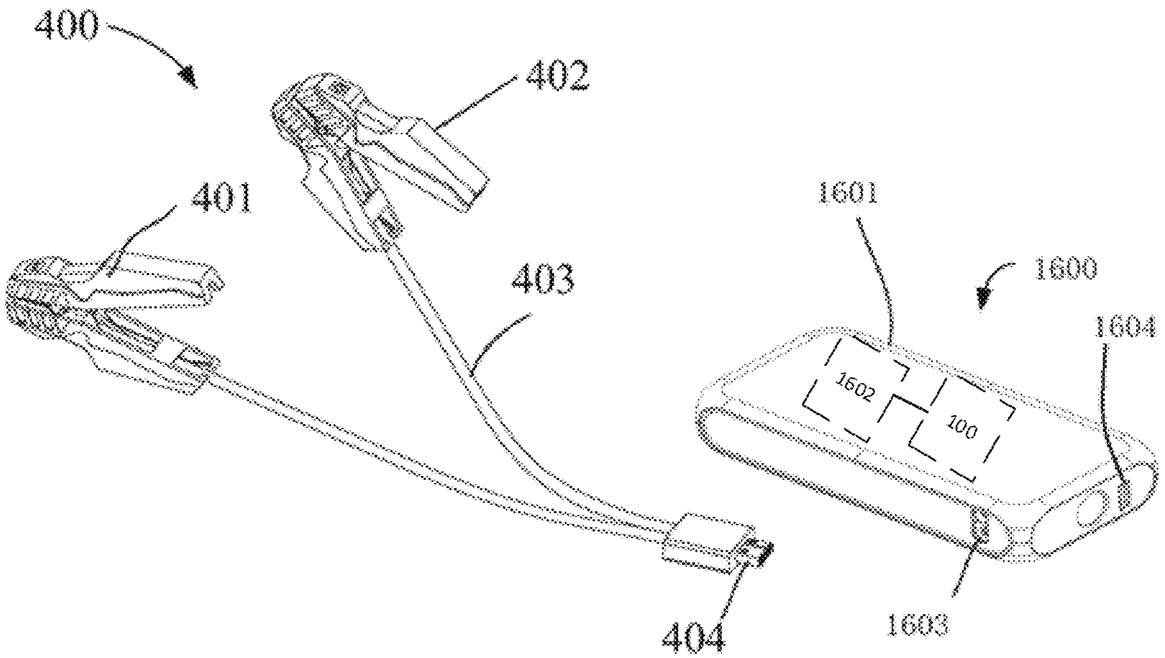
FIG. 16 is a schematic structural diagram illustrating a start power supply provided in implementations of the present disclosure.

Reference can be made to FIG. 16, and a start power supply 1600 using the above output control circuit 100 is also provided in implementations of the present disclosure. A start power supply may also be called a vehicle emergency start power supply or an emergency start power supply. As illustrated in FIG. 16, the start power supply 1600 includes a first housing 1601, a power supply module 1602, and the above output control circuit 100. The power supply module 1602 and at least part of the output control circuit 100 can be disposed in the first housing 1601, and at least part of the output control circuit 100 can be disposed on the first housing 1601. In FIG. 16, the power supply module 1602 is disposed in the first housing of the start power supply 1600.

In an implementation, the start power supply 1600 further includes a charging interface 1604 disposed on the first housing 1601. The charging interface 1604 is configured to be electrically connected with an external power supply, such as a utility power, to receive power from the external power supply to charge the power supply module 1602. Types of charging interfaces 1604 include, but are not limited to, a direct current (DC) interface, a universal serial bus (USB) interface, a micro USB interface, a mini USB interface, a Type-A interface, or a Type-C interface.

The power supply end 101 of the output control circuit 100 is configured to be connected with the power supply module 1602 of the start power supply 1600.

In this implementation, reference can be made to FIG. 16, the start power supply 1600 further includes a connecting port 1603 disposed on the first housing 1601, the connecting port 1603 is connected with the load end 102 of the output control circuit 100, the connecting port 1603 is configured to be connected with the external load device through an external connecting member 400, in other words, one end of the connecting member 400 is detachably connected with the connecting port 1603, and the other end of the connecting member 400 is detachably connected with the external load device. Appearance structure of the start power supply 1600 can adopt a structure of the start power supply 1600 illustrated in FIG. 16, or a structure of the start power supply 1600' illustrated in FIG. 17, or other structures. The appearance structure of the start power supply 1600 is not specifically limited in the present disclosure.

In this implementation, the connecting member 400 is a wire clip, which includes a first wire clip 401, a second wire clip 402, cables 403, and a connecting terminal 404. The first wire clip 401 and the second wire clip 402 are respectively connected with the connecting terminal 404 through the cables 403. The connecting terminal 404 is configured to be detachably and electrically connected with a connecting port 1603. The first wire clip 401 is configured to clip the positive electrode of the external load, and the second wire clip 402 is configured to clip the negative electrode of the external load. The positive electrode of the external load is electrically connected with a positive connecting end CAR+ of the load of the load end 102 through the first wire clip 401, the connecting terminal 404, and the connecting port 1603, and the negative electrode of the external load is electrically connected with a negative connecting end CAR− of the load of the load end 102 through the second wire clip 402, the connecting terminal 404, and the connecting port 1603.

Figure 17:
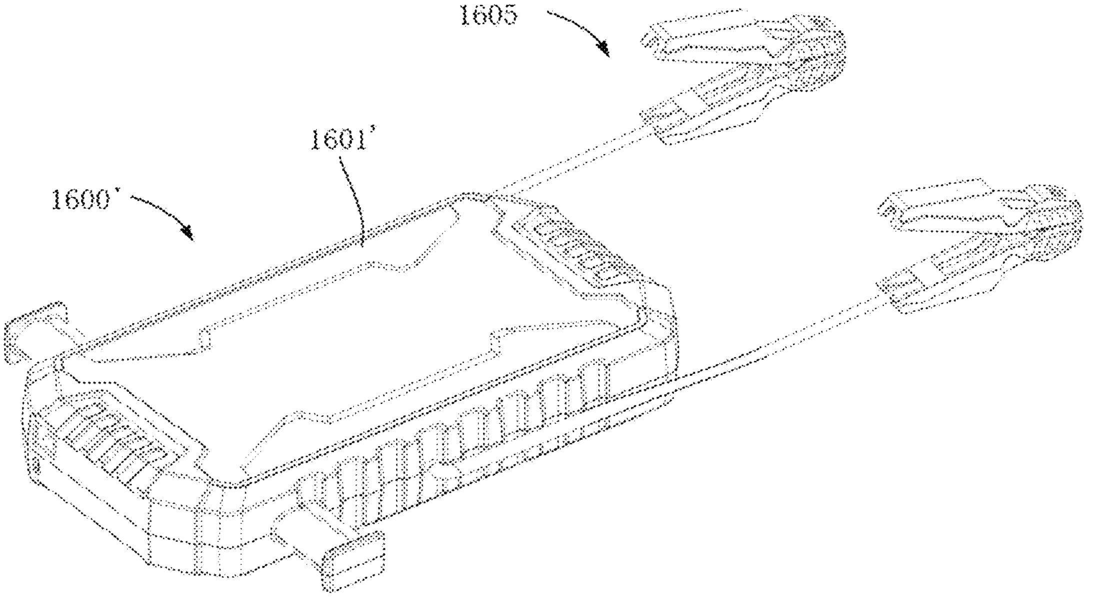
FIG. 17 is a schematic structural diagram illustrating a start power supply provided in other implementations of the present disclosure.

Optionally, in another implementation, reference can be made to FIG. 17, the start power supply 1600' further includes a connecting member 1605, one end of the connecting member 1605 is connected with the load end 102 of the output control circuit 100, and the other end of the connecting member 1605 is electrically connected with the external load. In other words, an end of the connecting member 1605 is built in the start power supply 1600'. In another implementation, the connecting member 1605 is a wire clip. A structure of the connecting member 1605 is similar to that of the connecting member 400 except that the connecting member 1605 does not include the connecting terminal 404, which will not be repeated here.

Figure 18:
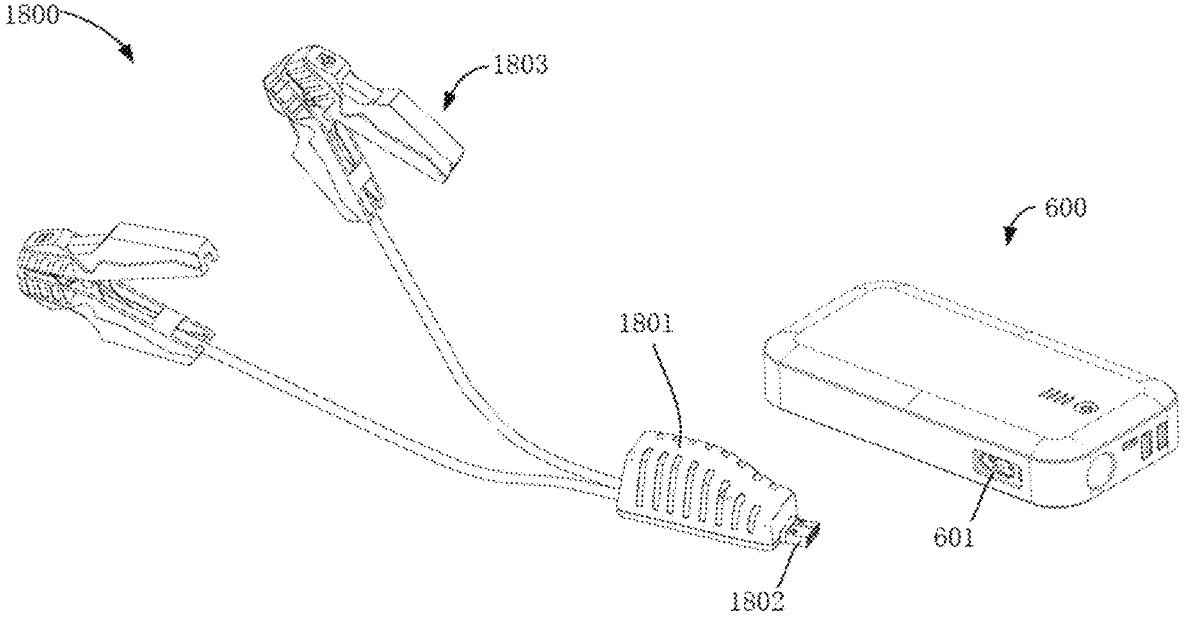
FIG. 18 is a schematic structural diagram illustrating a battery clip provided in implementations of the present disclosure.

Reference can be made to FIG. 18, and a battery clip 1800 using the above output control circuit 100 is also provided in the present disclosure. The battery clip 1800 includes a second housing 1801, a power supply input interface 1802, a connecting member 1803, and the above output control circuit 100. The power supply input interface 1802 is disposed on the second housing 1801. The power supply input interface 1802 is configured to be connected with an external power supply device 600, such as the emergency start power supply. The external power supply device 600 includes a battery module (which is not illustrated in FIG. 18). In this implementation, the power supply input interface

1802 is a connecting terminal, the external power supply device 600 further includes a connecting port 601 adapted to the power supply input interface 1802 of the battery clip 1800, and the battery clip 1800 realizes a connection with the external power supply device 600 through a detachable electrical connection between the power supply input interface 1802 and the connecting port 601.

At least part of the output control circuit 100 can be disposed in the second housing 1801, and at least part of the output control circuit 100 can be disposed on the second housing 1801.

The power supply end 101 of the output control circuit 100 is electrically connected with the power supply input interface 1802, and is connected with a power supply module of the external power supply device 600 through the power supply input interface 1802.

One end of the connecting member 1803 is electrically connected with the load end 102 of the output control circuit 100, and the other end of the connecting member 1803 is electrically connected with the external load. In this implementation, the connecting member 1803 is a wire clip. A structure of the connecting member 1803 is similar to that of the connecting member 400 except that the connecting member 1803 does not include the connecting terminal 404, which will not be repeated here.

Appearance structure of the battery clip 1800 can adopt a structure of the battery clip 1800 illustrated in FIG. 18 or other structures. The appearance structure of the battery clip 1800 is not specifically limited in the present disclosure.

Finally, it should be noted that the above implementations are only used to illustrate technical solutions of the present disclosure rather than limit. Although the present disclosure is illustrated in detail with reference to the above preferred implementations, those of ordinary skill in the art should understand that, any modification or equivalent replacement of the technical solutions of the present disclosure should not deviate from the spirit and scope of the technical solutions of the present disclosure.

Reference signs of the accompanying drawings provided in the present disclosure are only used for marking purposes, and do not limit the number of modules, units, circuits, or elements. The same reference signs of the accompanying drawings are not limited to the same modules.

It will be appreciated that the systems, apparatuses, and methods disclosed in some implementations provided in the present disclosure may also be implemented in various other manners. For example, the above described apparatus implementations are merely exemplary, e.g., the division of units is only a division of logical functions, and there may exist other manners of division in practice, e.g., multiple units or assemblies may be combined or may be integrated into another system, or some features may be ignored or skipped. In other respects, the coupling or direct coupling or communication connection as illustrated or discussed may be an indirect coupling or communication connection through some interfaces, apparatuses or units, and may be electrical, mechanical, or otherwise.

The above are the preferable implementations of the present disclosure. It should be noted that, for those of ordinary skill in the art, without departing from a concept of the present disclosure, several modifications and improvements can be made, and these modifications and improvements all fall within the protection of scope of the present disclosure.

What is claimed is:

1. An output control circuit, comprising:

a power supply end configured to be connected with a power supply module;

a load end configured to be connected with an external load device;

a first protection module, the power supply end being electrically connected with the load end through the first protection module, wherein the first protection module is configured to disconnect an electrical connection between the power supply end and the load end or limit a current, based on a power supply state of the power supply module supplying power to the external load device; and a second protection module, wherein the power supply end is connected with the load end through the second protection module; and the second protection module is configured to prevent the external load device from charging the power supply module.

2. The output control circuit of claim 1, wherein the power supply state comprises a power supply parameter, and the power supply parameter comprises at least one of: a power supply current or a power supply voltage; and the first protection module configured to disconnect the electrical connection between the power supply end and the load end or limit the current, based on the power supply state of the power supply module supplying power to the external load device is configured to disconnect the electrical connection between the power supply end and the load end or limit the current, based on a value of the power supply parameter.

3. The output control circuit of claim 1, wherein the power supply state comprises power supply duration; and the first protection module configured to disconnect the electrical connection between the power supply end and the load end or limit the current, based on the power supply state of the power supply module supplying power to the external load device is configured to disconnect the electrical connection between the power supply end and the load end or limit the current, based on the power supply duration.

4. The output control circuit of claim 2, wherein the power supply state further comprises power supply duration; and the first protection module configured to disconnect the electrical connection between the power supply end and the load end or limit the current, based on the power supply state of the power supply module supplying power to the external load device is configured to disconnect the electrical connection between the power supply end and the load end or limit the current, based on the value of the power supply parameter and the power supply duration.

5. The output control circuit of claim 4, wherein response time of the first protection module disconnecting a connection between the power supply end and the load end or limiting the current is related to the value of the power supply parameter.

6. The output control circuit of claim 4, wherein the first protection module configured to disconnect the electrical connection between the power supply end and the load end or limit the current, based on the power supply state of the power supply module supplying power to the external load device is configured to disconnect a connection between the power supply end and the load end or limit the current, in response to a value of a first power supply current being greater than a preset current threshold and power supply duration of the first power supply current being greater than the response time; wherein the response time is negatively related to the value of the first power supply current.

7. The output control circuit of claim 6, wherein a current value of the power supply module supplying power to the external load device is greater than the preset current threshold, on condition that the load end is reversely connected with the external load device, and/or the load end is short-circuited.

8. The output control circuit of claim 6, wherein a current peak value of the power supply module supplying power to the external load device is greater than the preset current threshold, and power supply duration with the current peak value is less than response time for the current peak value, on condition that the load end is forwardly connected with the external load device.

9. The output control circuit of claim 1, wherein the first protection module configured to disconnect the electrical connection between the power supply end and the load end, based on the power supply state of the power supply module supplying power to the external load device is configured to disconnect a connection between the power supply end and the load end, in response to the number of times of supplying power to the external load device per unit time for ignition of the external load device being greater than a preset number of times.

10. The output control circuit of claim 1, wherein the first protection module is further configured to restore a power-on state between the power supply end and the load end, on condition that a state of the first protection module reaches a preset recovery condition, after disconnecting a connection between the power supply end and the load end.

11. The output control circuit of claim 10, wherein the preset recovery condition comprises that the first protection module has a temperature which is less than a preset temperature threshold.

12. The output control circuit of claim 1, wherein the first protection module is configured to disconnect the electrical connection between the power supply end and the load end or limit the current, based on the power supply state of the power supply module supplying power to the external load device, on condition that the load end is reversely connected with the external load device, and/or the load end is short-circuited; and the first protection module is configured to switch from disconnecting the electrical connection between the power supply end and the load end or limiting the current to restoring a power-on state between the power supply end and the load end, on condition that the load end is switched from being reversely connected with the external load device to having no load or being forwardly connected with the external load device.

13. The output control circuit of claim 1, wherein the power supply end comprises a first power supply end and a second power supply end, and the load end comprises a first load end and a second load end, wherein the first protection module and the second protection module are both connected between the first power supply end and the second power supply end; or the first protection module is connected between the first power supply end and the first load end, and the second protection module is connected between the second power supply end and the second load end.

14. The output control circuit of claim 1, further comprising:

a collecting module configured to collect a parameter of the output control circuit and determine a detecting signal; and a prompting module configured to trigger a prompting state corresponding to the detecting signal, wherein the prompting state is indicative of an operating state of the output control circuit.

15. The output control circuit of claim 14, further comprising a control module, wherein the control module configured to determine a prompting control signal based on the detecting signal; and the prompting module configured to determine the prompting state based on the prompting control signal.

16. The output control circuit of claim 14, wherein the collecting module comprises a communication module, the communication module is configured to communicate with an access device of the output control circuit to obtain a parameter of the access device, and determine a detecting signal of the access device based on the parameter of the access device;

the detecting signal comprises the detecting signal of the access device; and the access device comprises at least one of: the power supply module or the external load device.

17. The output control circuit of claim 15, further comprising at least one of: a first wake-up module or a second wake-up module; wherein the first wake-up module is configured to generate a first wake-up signal based on a current detecting signal of a pathway between the power supply end and the load end, and the first wake-up signal is used to wake up the control module; and the second wake-up module comprises a touch unit and is configured to generate a second wake-up signal in response to a touch operation of the touch unit, and the second wake- up signal is used to wake up the control module.

18. A start power supply, comprising:

a first housing;

a power supply module; and an output control circuit, wherein the output control circuit comprises:

a power supply end configured to be connected with a power supply module;

a load end configured to be connected with an external load device;

a first protection module, the power supply end being electrically connected with the load end through the first protection module; wherein the first protection module is configured to disconnect an electrical connection between the power supply end and the load end or limit a current, based on a power supply state of the power supply module supplying power to the external load device; and a second protection module, wherein the power supply end is connected with the load end through the second protection module; and the second protection module is configured to prevent the external load device from charging the power supply module;

wherein the power supply module and at least part of the output control circuit are disposed in the first housing; and the power supply end of the output control circuit is configured to be connected with the power supply module of the start power supply.

19. A battery clip, comprising:

a second housing;

a power supply input interface disposed on the second housing and configured to be connected with a power supply module; and an output control circuit, wherein the output control circuit comprises:

a power supply end configured to be connected with a power supply module;

a load end configured to be connected with an external load device;

a first protection module, the power supply end being electrically connected with the load end through the first protection module; wherein the first protection module is configured to disconnect an electrical connection between the power supply end and the load end or limit a current, based on a power supply state of the power supply module supplying power to the external load device; and a second protection module, wherein the power supply end is connected with the load end through the second protection module; and the second protection module is configured to prevent the external load device from charging the power supply module;

wherein at least part of the output control circuit is disposed in the second housing; and the power supply end of the output control circuit is configured to be connected with the power supply input interface, and be connected with the power supply module through the power supply input interface.

* * * * *